United States Patent
Yoshioka

(10) Patent No.: US 8,832,202 B2
(45) Date of Patent: Sep. 9, 2014

(54) E-MAIL INFORMATION MANAGEMENT APPARATUS, AND E-MAIL INFORMATION MANAGEMENT METHOD

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 12/208,068

(22) Filed: Sep. 10, 2008

(65) Prior Publication Data

US 2009/0100079 A1 Apr. 16, 2009

(30) Foreign Application Priority Data

Oct. 12, 2007 (JP) ................................ 2007-266064

(51) Int. Cl.
*G06F 15/16* (2006.01)
*G06Q 10/10* (2012.01)
*H04L 9/32* (2006.01)

(52) U.S. Cl.
CPC ............ *G06Q 10/107* (2013.01); *H04L 9/3242* (2013.01); *H04L 9/3263* (2013.01)
USPC .......................................... 709/206; 713/176

(58) Field of Classification Search
CPC ..... H04L 51/34; H04L 51/30; H04L 12/5875; H04L 63/123; H04L 9/3263; H04L 9/3242
USPC .......................................... 709/206; 713/176
See application file for complete search history.

(56) References Cited

U.S. PATENT DOCUMENTS

| | | | | |
|---|---|---|---|---|
| 5,005,200 A | * | 4/1991 | Fischer ............................ | 380/30 |
| 5,465,299 A | * | 11/1995 | Matsumoto et al. .......... | 713/176 |
| 7,596,689 B2 | * | 9/2009 | Toh et al. ....................... | 713/150 |
| 2004/0073617 A1 | * | 4/2004 | Milliken et al. ............... | 709/206 |
| 2005/0015455 A1 | * | 1/2005 | Liu ................................. | 709/207 |
| 2005/0198511 A1 | * | 9/2005 | Tomkow ........................ | 713/176 |
| 2006/0031315 A1 | * | 2/2006 | Fenton et al. .................. | 709/206 |
| 2006/0168006 A1 | * | 7/2006 | Shannon et al. ............... | 709/206 |
| 2006/0190545 A1 | * | 8/2006 | Banerjee et al. ............... | 709/206 |
| 2006/0277597 A1 | * | 12/2006 | Dreymann ......................... | 726/4 |
| 2007/0005702 A1 | * | 1/2007 | Tokuda et al. ................. | 709/206 |
| 2007/0174402 A1 | * | 7/2007 | Tomkow ........................ | 709/206 |
| 2007/0220259 A1 | * | 9/2007 | Pavlicic ......................... | 713/176 |
| 2008/0282344 A1 | * | 11/2008 | Shuster ........................... | 726/21 |
| 2008/0313704 A1 | * | 12/2008 | Sivaprasad et al. ............... | 726/2 |
| 2009/0006860 A1 | * | 1/2009 | Ross .............................. | 713/189 |
| 2009/0031135 A1 | * | 1/2009 | Kothandaraman ............. | 713/176 |
| 2009/0037340 A1 | * | 2/2009 | Hitchen et al. .................. | 705/76 |

FOREIGN PATENT DOCUMENTS

JP    A 2005-101883    4/2005

OTHER PUBLICATIONS

Higashikado et al.; "Partial Integrity Assurance Technology PIAT: An Application to Sender Domain Authentication;" Information Processing Society of Japan Technical Reports; pp. 337-340; Jul. 20, 2007.

* cited by examiner

*Primary Examiner* — Andrew Georgandellis
*Assistant Examiner* — James Forman
(74) *Attorney, Agent, or Firm* — Greer Burns & Crain Ltd.

(57) ABSTRACT

An E-mail information management apparatus acquires a plurality of predetermined information from a mail header and a mail body and signature related information as signature target information, produces feature variable information and electronic signature data, and stores the signature target information, the variable information and the electronic signature data, as signature header information in a header portion of the E-mail.

17 Claims, 14 Drawing Sheets

FIG. 14

MIME-multipart E-MAIL INFORMATION ADDED WITH SIGNATURES OF
SMTP SERVER 1 AND SMTP SERVER 2

HEADER INFORMATION

| From: userA@xx.com |
| To: ml@zz.com |
| Subject: [ml:001] hello |
| MIME-Version: 1.0 |
| Content-Type: multipart/mixed; boundary="boundary_str" |

PIAT-Signature: d=xx.com;a=rsa-sha1;
h=From:To:Subject:X-Content-Type-Body;
h-hash=0xf81dca2e22:0x31dca9ba12:0x5243cd2a8b:0xf91d38aac1;
h-org=userA@xx.com:ml@zz.com:hello:HELLO, HOW ARE YOU?;
t=20070801154256;
b=8ffkadalo1lRDI2jsdl82

PIAT-Signature: d=zz.com;a=rsa-sha1;
h=From:To:Subject:X-Content-Type-Body:X-Content-Type-Advertisement;
h-hash=0xf81dca2e22:0x31dca9ba12:0xa8bdc1238c:0xf91d38aac1:0xg8akadi354;
h-org=userA@xx.com:ml@zz.com:[ml:001] hello: HELLO, HOW ARE YOU?
○△ PROVIDER WITH SECURITY AND SAFETY;
t=20070801154501;
b=jf987a3bdFHalq13291bd (BLANK LINE)

ADD → BODY INFORMATION

--boundary_str
X-Content-Type-Body
Content-Type: text/plain; charset="ISO-2022-JP"
(BLANK LINE)
ADD → HELLO, HOW ARE YOU?
--boundary_str
X-Content-Type-Advertisement
Content-Type: text/plain; charset="ISO-2022-JP"
(BLANK LINE)
○△ PROVIDER WITH SECURITY AND SAFETY
--boundary_str--

E-MAIL INFORMATION MANAGEMENT APPARATUS, AND E-MAIL INFORMATION MANAGEMENT METHOD

CROSS REFERENCES TO RELATED APPLICATIONS

This application is related to and claims priority to Japanese Patent Application No. 2007-266064 filed on Oct. 12, 2007 in the Japanese Patent Office, and incorporated by reference herein.

FIELD

The present invention relates to a recording medium storing an E-mail information management program, an E-mail information management apparatus, and an E-mail information management method, which can manage E-mail information and can easily certify that the E-mail information has been correctly sent.

BACKGROUND

In an Internet era, electronic mail (E-mail) serves as a new infrastructure. At present, E-mail is indispensable as a communication tool in every kind of field including companies (business), schools (education), private communications to acquaintances and friends, etc.

As reasons for widespread use of E-mail, the transmission and reception cost is much cheaper than that of the existing similar means. Also, information equipment utilizing E-mail is not limited to the conventional personal computer environment, and the mail function is incorporated in mobile terminals such as cell phones and PDAs (Personal Digital Assistants). Thus, the E-mail can be said as being electronic information that has been recently utilized and popularized in an explosive way.

Meanwhile, troubles regarding certification of contents of E-mail and mass mailing (spam mail) have become social problems. For the certification of contents of E-mail, there are known a method using S/MIME (Secure Multipurpose Internal Mail Extensions, i.e., standards of an E-mail encryption system) and a technique related to an apparatus for certificating originality of an E-mail document.

More specifically, according to the S/MIME, encryption and an electronic signature are applied to a mail body (text) to prevent tapping, impersonation, tampering (falsification), etc. Another conceivable technique is to provide an originality certifying apparatus which adds an electronic signature to both E-mail and a file attached to it when the mail is sent, and which detects tampering when the mail is received. Requirements for security of E-mail can be satisfied by storing the body of the E-mail and the attached file in the encrypted form in the originality certifying apparatus and further restricting access to it.

Further, to cope with nuisance (spam) mail, an electronic signature can be added to E-mail in many cases to certify the contents thereof as with the case of storing general documents. The spam mail is sent from a mail sender who misrepresents information regarding a mail source to cover up the sender's identity. For example, a sender cites, as a sender address in a mail header (i.e., a mail address portion subsequent to "From:"), a mail address in a header of another mail and sends mail under the feigned address or the assumed identity.

In view of such a situation, an anti-spam technique (sender domain identification technique) has been recently developed which focuses on specifying a counterfeit mail address. The sender domain identification technique is divided into two types, i.e., one utilizing an IP address and the other utilizing an electronic signature. DKIM (DomainKeys Identified Mail) is known as a typical example of the sender domain identification technique of the type utilizing an electronic signature.

The DKIM enables a server having sent mail to be identified or checked on the receiver side. More specifically, the header and the body of mail are processed together to produce an electronic signature of an SMTP server (sender side mail server), and the produced information is added as a "DKIM-Signature:" header.

The "DKIM-Signature:" header has attributes for storing (holding) various items of information. Primary ones of the attributes include an attribute d (e.g., d=xx.com) for indicating the name of the sender domain where an electronic signature has been added, an attribute a (e.g., a=rsa-sha1) for storing an algorithm used to produce the signature, an attribute h (e.g., h=From:To:Subject:Content-type) for indicating which item is to be a signature target, and an attribute b (e.g., b=tfx8cgksw92) for storing information of the electronic signature produced in the sender domain.

By sending mail to a receiver after addition of the "DKIM-Signature:" header including the above-described attributes, the receiver can identify the mail server by verifying the contents (such as the attributes and the electronic signature) of the "DKIM-Signature:" header.

In addition, because the header and the body of mail are processed together to produce the electronic signature, a false statement can be prevented from being generated, for example, by citing a part of the header (sender address subsequent to "From") and safe mail sending can be realized. At present, standardization (into the form of RFC (Request for Comments)) of the DKIM having the above-described features is being rapidly progressed by a plurality of concerned vendors.

However, the above-mentioned three known techniques have the following problems.

The S/MIME cannot deal with spam mail because the electronic signature is not applied to the mail header information, such as the sender (mail address subsequent to "From"), the destination (mail address subsequent to "To"), and the subject (item subsequent to "Subject").

In other words, the S/MIME is focused on safely managing E-mail by the apparatus for certificating originality of an E-mail document and pays attention to only certification of "content information", i.e., the mail body and the attached filed. Therefore, if the mail header information, such as the sender ("From"), the destination ("To"), and the subject ("Subject"), is changed or added, the sender ("From"), the subject ("Subject"), and the contents of the mail body cannot be individually confirmed with the S/MIME.

Also, it is known that the DKIM is unsuitable for broadcast mail based on a mailing list (hereinafter abbreviated to "ML") in which a region including part of the mail header and the body is automatically changed.

The mailing list means a list of E-mail addresses, which enables a message to be automatically sent as E-mail to only a certain group of subscribers. A message sent from one subscriber to the list is delivered to all the other subscribers. Further, the subscribers having registered in the mailing list can send messages, give replies, and read the messages among them.

In the mailing list, the mail posted to the ML address is sent to an ML server and is processed therein. At that time, the ML server automatically changes the body and the header of the mail in many cases, which are subjected to the electronic signature, when the mail is resent. Thus, the electronic signature produced at the time of posting is destroyed, and it can no longer be verified on the receiver side.

For example, because the ML name and the numbering are often inserted in the "Subject:" header, substantial care is required when the DKIM is applied to the ML.

In fact, the application to the ML is studied in details in the standardization of the DKIM. It is recommended, for example, to perform identification of the sender domain in the ML domain, and upon success of the identification, to produce an electronic signature after adding a new header regarding the ML, thereby replacing the "DKIM-Signature:" header (namely, deleting the previously stored electronic signature that has been put in the sender domain).

In such a case, since the electronic signature having been put in the sender domain is deleted, the known DKIM specifications just allow the identification of the immediately preceding sender domain and cannot perform confirmation regarding through which routes the mail has been delivered (i.e., regarding identification of the sending source mail servers included in the routes). In other words, the known DKIM specifications cannot identify all routes from the transmission to the reception.

Further, some providers presenting ML servers with no charge insert an advertisement in part of a mail body. Thus, the known DKIM specifications are not adaptable for rewrite of the mail body.

SUMMARY

According to an aspect of an embodiment, an e-mail information management apparatus is provided by an information acquiring unit for acquiring a plurality of predetermined information from a mail header and a mail body, and acquiring, as signature related information, information relating to said plurality of predetermined information and including network information, thereby acquiring, as signature target information, said acquired information with attributes thereof made corresponding to respective attribute tags; a feature variable information producing unit for producing feature variable information for said signature target information acquired by said information acquiring unit, and acquiring said feature variable information in a corresponding relation to attribute tags indicating said feature variable information; an electronic signature data producing unit for applying an electronic signature to an entirety of both said signature target information acquired by said information acquiring unit and said feature variable information produced by said feature variable information producing unit, thereby producing electronic signature data, and acquiring said electronic signature data in a corresponding relation to an attribute tag indicating said electronic signature data; and a header information storing unit for storing, as signature header information, said signature target information acquired by said information acquiring unit, said feature variable information produced by said feature variable information producing unit, and said electronic signature data produced by said electronic signature data producing unit in a header portion of E-mail in a corresponding relation to said associated attribute tags.

BRIEF DESCRIPTION OF THE DRAWINGS

FIG. 14 is a representation showing the MIME-multipart E-mail information (added with "X-Content-Type") after the addition of the signature by the SMTP server 2 in the second embodiment.

DESCRIPTION OF THE PREFERRED EMBODIMENTS

First Embodiment

Figure 1:
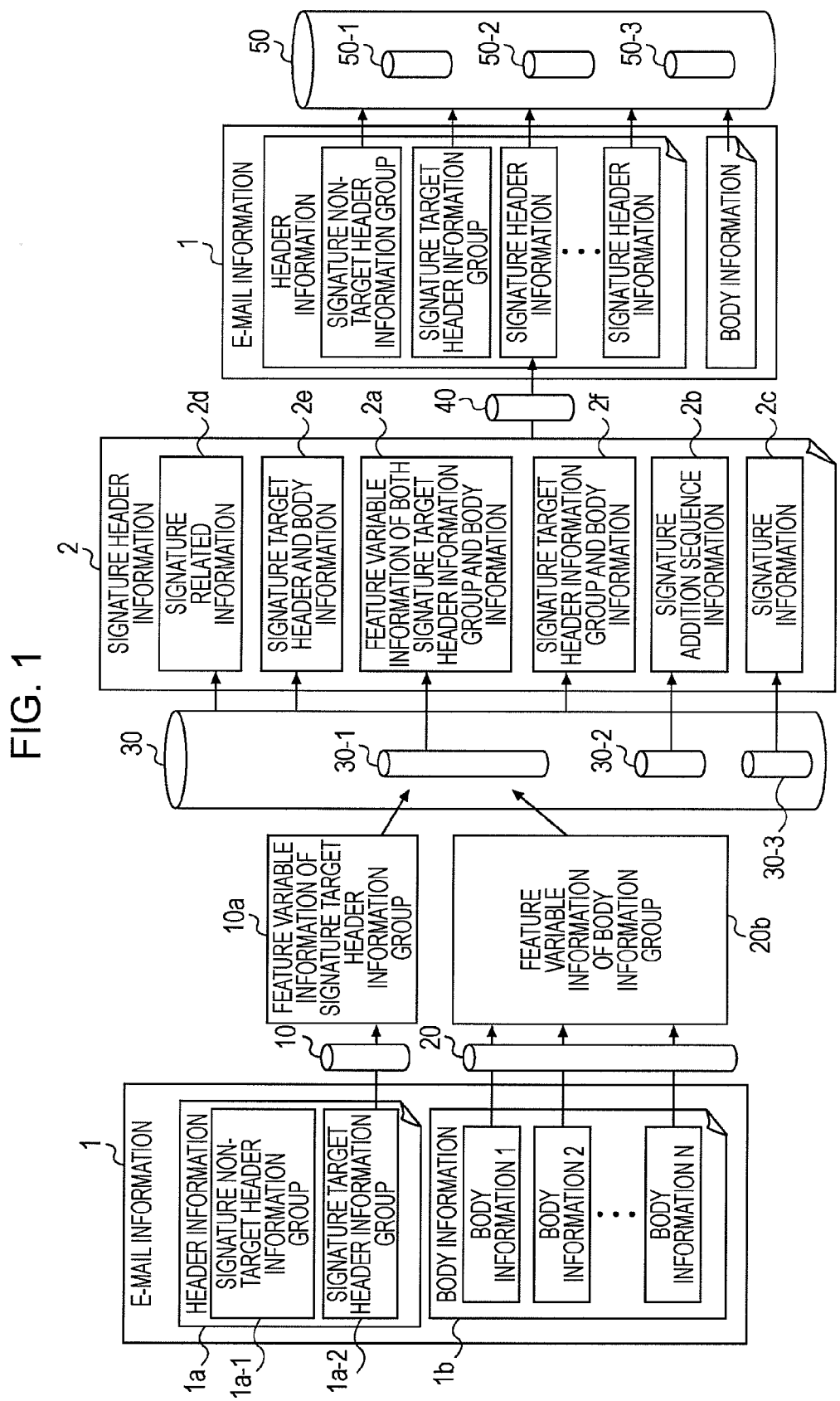
FIG. 1 is a block diagram for explaining the principle of overall operation in an embodiment.
Figure 2:
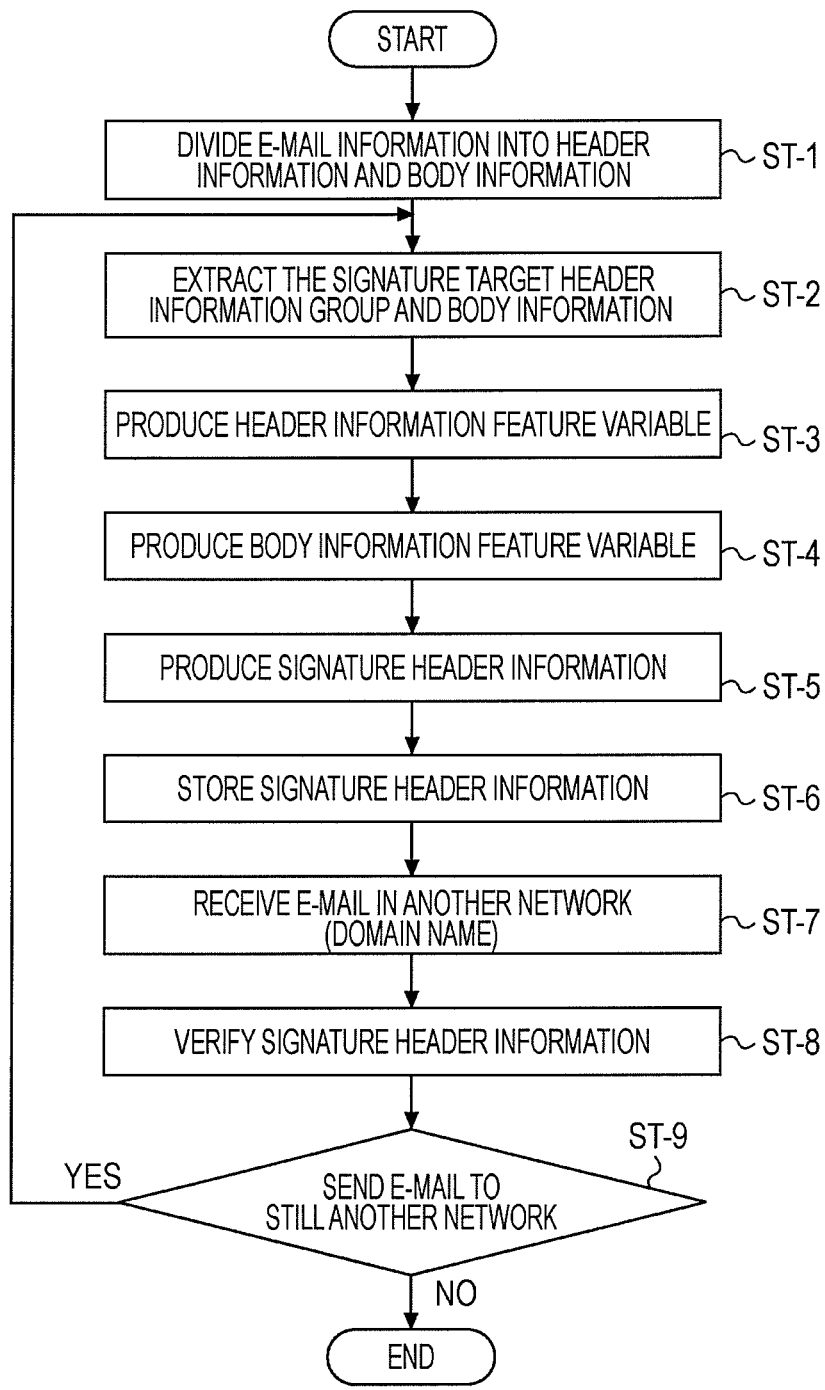
FIG. 2 is a flowchart for explaining the principle of the embodiment.

FIG. 1 is a block diagram for explaining the principle of overall operation in an embodiment, and FIG. 2 is a processing flowchart of the overall operation in the embodiment.

The overall operation shown in FIG. 2 is started when E-mail information 1 is prepared and sent to another network system. First, the E-mail information 1 is divided into header information 1a, including a sender ("From"), a destination ("To"), a subject ("Subject"), etc., and body information 1b representing the contents of a mail body (ST-1). Further, the header information 1a is separated and divided into a signature non-target header information group 1a-1 which does not require originality certification (content certification) later, and a signature target header information group 1a-2 which requires originality certification (content certification) later. The body information 1b is divided, as required, into parts of body information from 1 to N depending on the contents thereof.

Also, in the case of MIME (Multipurpose Internet Mail Extensions)-multipart mail, the body information is divided by referring to identifiers that enable parts of the body information to be discriminated (ST-2).

The embodiment includes a header-information feature variable producing unit 10 for producing feature variable information 10a of the separated and divided signature target header information group (ST-3), and a body-information feature variable producing unit 20 for producing feature variable information 20b of the body information group (ST-4).

Further, the embodiment includes a feature variable set producing unit 30-1 for integrating the feature variable information of the signature target header information group and the feature variable information of the body information group together and producing feature variable information 2a of both the signature target header information group and the body information, a signature addition-sequence information acquiring unit 30-2 for acquiring information 2b to ensure validity of a signature addition sequence, and a signature information producing unit 30-3 for producing and adding signature information 2c.

In addition, the embodiment includes a signature header information producing unit 30 for producing signature header information 2 that includes not only signature related information 2d, signature target header & body information 2e, signature target header information group & body information 2f, the feature variable information 2a of the former, and the signature addition sequence information 2b, but also "signature information" of a signer for those contents 2c (ST-5). The signature header information 2 is additionally written and stored (held) in the header information within the E-mail information 1 by a signature header information storing unit 40 (ST-6).

The above-described operation is repeated whenever the E-mail is delivered to another network (second network) within a delivery route. On that occasion, the previously stored signature header information 2 is not overwritten, and the new signature header information 2 is additionally written and stored with revision status management.

When the sent E-mail is received by another network (i.e., a network having a different domain name) (ST-7), verification of the signature header information is executed as described later (ST-8). When the E-mail is sent to still another network (third network) (e.g., in the case of sending broadcast mail) (YES in ST-9), the processing returns to step ST-2. Then, in a similar manner to that described above, new signature header information 2 is produced in the second network by using the header-information feature variable producing unit 10, the body-information feature variable producing unit 20, and the signature header information producing unit 30. The new signature header information 2 is additionally written and stored in the header information within the E-mail information 1 by the signature header information storing unit 40. On that occasion, the previously stored signature header information 2 is not overwritten, and the new signature header information 2 is successively stored and recorded with revision status management.

For a process (ST-8) of verifying the signature header information, the embodiment includes an electronic information verifying unit 50. The electronic information verifying unit 50 comprises a signature header information tampering verifying unit 50-1 having a function to verify that the stored signature header information 2 is not altered, an item feature-variable information verifying unit 50-2 having a function to produce feature variable information from the header information and the body information within the E-main information 1, to compare the produced feature variable information with the feature variable information stored in the signature header information 2, and to confirm the presence or absence of change, and a signature header information verifying unit 50-3 having a function to compare and verify all items of the signature header information 2 as a verification target, and to confirm the presence or absence of change per item (ST-8).

Figure 3:
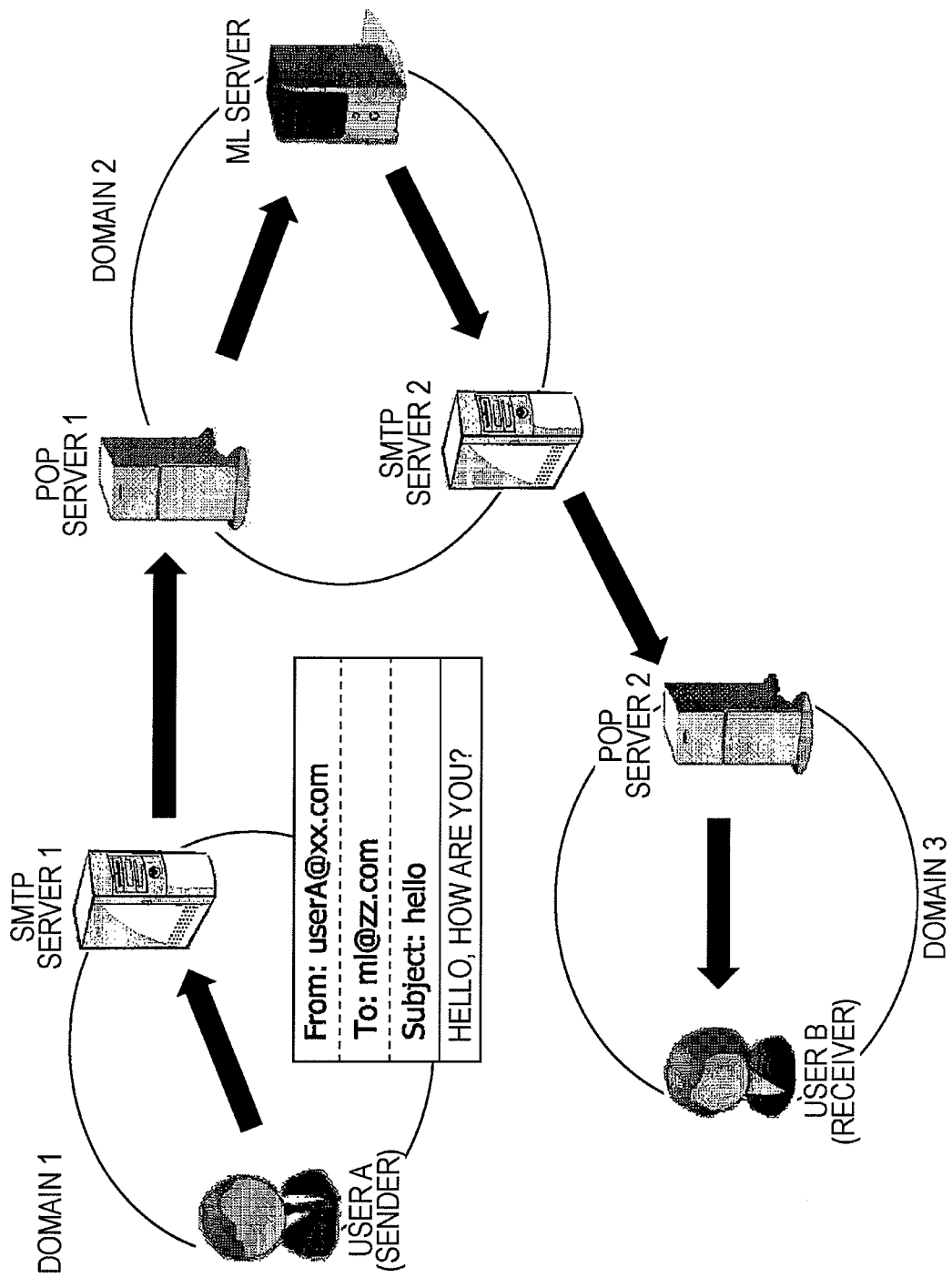
FIG. 3 is an illustration showing participating entities and the environment in a first embodiment.

To show a detailed example of the embodiment, the following description is made by setting participating entities and a mail delivery environment as shown in FIG. 3, and supposing a scene where broadcast mail sent from a user A (sender) is delivered to a user B (receiver) from a domain 1 (first network system) via a domain 3 (third network system).

More specifically, the following scene is supposed. A user A (sender) sends broadcast mail comprising header information that includes the "sender (From): userA@xx.com", the "destination (To): ml@zz.com", and the "subject (Subject): hello", and a message "Hello, How are you?" as mail body information. Then, a user B (receiver) confirms the change at each point of delivery, the route information indicating along which the mail has been delivered, and the contents of mail information (i.e., the header information and the body information).

It is further assumed that the user B (receiver) is in a state capable of reading and receiving the broadcast mail (ml@zz.com). The following description is made of two embodiments in which the header information is added and changed by the ML server in the domain 2. The first embodiment represents a scene where only the subject "(Subject)" is rewritten, and the second embodiment represents a scene where the subject "(Subject)" is rewritten and an advertisement is added to the main body.

First Embodiment

The first embodiment is described by supposing the scene where only the subject "(Subject)" is rewritten by the ML server in the domain 2. In the first embodiment, it is also premised that all items in the mail information are subjected to a signature target.

Figure 4:
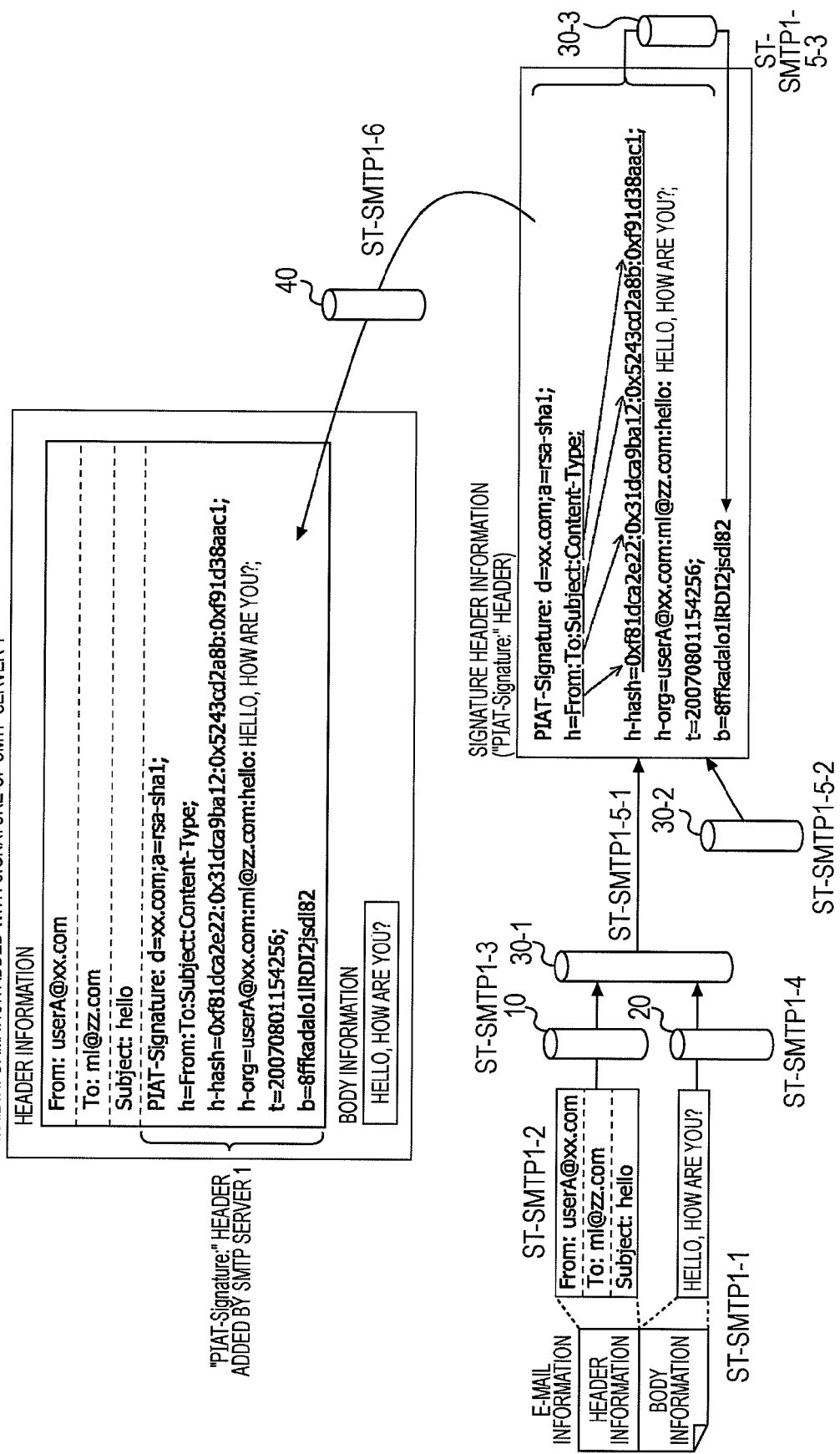
FIG. 4 is a representation showing a signature addition process by an SMTP server 1 in the first embodiment.

FIG. 4 shows a signature addition process by the SMTP server 1 in the first embodiment.

When the user A (sender) presses a run button for mail creation and mail sending, the SMTP server 1 first divides the mail information into the header information and the body information (ST-SMTP1-1), and then extracts the signature target header information group and the body information (ST-SMTP1-2). In this embodiment, because it is premised that all items in the mail information are subjected to the signature target, the signature target header information group includes the sender ("From"), the destination ("To"), the subject ("Subject"), and the body information ("Content-Type"). Selection of the signature target header information group can be realized with definition previously set in a mail system, or with the sender who designates and selects items to be certified.

Next, feature variable information of the signature target header information group extracted in ST-SMTP1-2 is produced (ST-SMTP1-3), and feature variable information of the body information is produced (ST-SMTP1-4).

Subsequently, the feature variable information of the signature target header information group and the feature variable information of the body information are integrated together and recorded as an attribute value of signature header information ("PIAT-Signature:" header) (ST-SMTP1-5-1) FIG. 4 shows that, in this embodiment, "0xf81dca2e22" is calculated as the feature variable of the "From:" header, "0x31dca9ba12" is calculated as the feature variable of the "To:" header, "0x5243cd2a8b" is calculated as the feature variable as the "Subject:" header, and "0xf91d38aac1" is calculated as the feature variable as the "Content-Type:" header, respectively.

Also, as one example for integrating the two kinds of feature variable information, an attribute h (h: attribute tag) for storing the signature target header is prepared, and items of header information are stored as signature targets in the attribute h such that the items are listed one after another with a colon (:) interposed between the items to serve as a boundary.

Further, an attribute h-hash for storing the feature variable information of both the signature target header information group and the body information is prepared, and the feature variables are stored in the attribute h-hash such that they are listed, as in the attribute h, one after another with a colon (:) interposed therebetween to serve as a boundary.

With such an arrangement, the items of information stored in the respective headers can be systematically correlated to one another in sequence thereof. Other examples of the attributes of the "PIAT-Signature:" header include, as attributes of the signature related information, an attribute d (d: attribute tag) (e.g., d=xx.com) for storing the name of the domain (information of the network) where a signature has been put, and an attribute a (a: attribute tag) (e.g., a=rsa-sha1) for storing an algorithm that has been used to produce the signature. This embodiment represents the case of recording the attribute d and the attribute a.

By storing, in the attribute a, the algorithm that has been used to produce the signature, it is possible to confirm the used algorithm and to determine validity of the signature later. Accordingly, signature algorithms to be used in producing and verifying signatures in next and subsequent deliveries can be easily searched for.

Further, the "PIAT-Signature:" header records therein an attribute h-org for storing the original header information and body information, and an attribute t (t: attribute tag) (e.g., t=20070801154256) for storing the information to ensure validity of the signature addition sequence (i.e., information for ensuring the proper time sequence of the signature information).

The attribute t is provided by acquiring the signature addition sequence information in advance. This embodiment represents the case of using date and time information. More specifically, "20070801154256", i.e., "2007(year)/08(month)/01(day)/15(hour)/42(minute)/56(sec)", is stored as the attribute t (ST-SMTP1-5-2).

When the date and time information is employed, it is easily understood that proper date and time information issued from the third organization and being unalterable is desirably acquired. An incremental counter method of successively incrementing a number from 1 may also be used instead of the date and time information.

Upon completion of storing the above-described attributes, the signature information is produced for the entire signature header information as a target (ST-SMTP1-5-3). In this embodiment, a hash value is produced with all the contents of the "PIAT-Signature:" header (from the "PIAT-Signature:" to "t=20070801154256") being the signature target, and signature information is produced by using a secret key of the SMTP server 1. An attribute b for storing the signature information is prepared and the produced signature information is stored in the attribute b.

To produce the signature information by using a secret key, a pair of secret key and public key is previously produced in the SMTP server 1, and that secret key is used to produce the signature information. The public key in the pair is made open to the public on the SMTP server 1 so that the public key can be acquired on the receiving side.

FIG. 4 shows the case where b=8ffkadalo1lRDI2jsdl82 is stored as the last attribute of the "PIAT-Signature:" header. Thus, by employing the "PIAT-Signature:" header (not including the attribute b, i.e., the signature information, in this embodiment) as the signature target, a scheme can be realized which does not allow the "PIAT-Signature:" header to be changed other than in the domain where the relevant signature has been added, and which can serve to prevent tampering of the "PIAT-Signature:" header.

Certification power can be increased by utilizing a time stamp, i.e., a technique to ensure a confirmation time, in addition to the signature information. However, adding the time stamp is not always essential in this embodiment.

Further, in this embodiment, the attribute h-org is provided to store the original header information and body information.

If the original contents are not stored as in the attribute h-org, a problem arises in that when the contents are changed in a subsequent delivery process, a fact of the change can be confirmed, but from which state the contents have been changed cannot be confirmed. The attribute h-org is provided to enable the latter change to be confirmed. However, at least the body information may increase the quantity of information with a high probability, and storing the body information in the header is not so preferable from the viewpoint of the increased quantity of information and safety. Whether to store the body information is selected in accordance with the policy of a supervising SMTP server. On the other hand, the presence of the attribute h-org affects fullness of verification service. For that reason, the role of the attribute h-org is optionally provided.

When the signature header information is completely produced by the SMTP server 1, the produced signature header information is stored in the header of the E-mail information by the signature header information storing unit 40 (ST-SMTP1-6).

While in this embodiment the signature header information is stored in the header information as a part thereof, the signature header information may be entirely managed by using another server. In such a case, however, it is required to separately manage to which mail the signature header information corresponds. Accordingly, the signature header information is desirably stored in the header information within the E-mail information in sequence and is delivered.

When the signature header information is completely produced by the SMTP server 1 and the produced signature header information is stored in the header of the E-mail information, the mail is sent from the SMTP server 1 to the POP server 1 in the domain 2.

Figure 5:
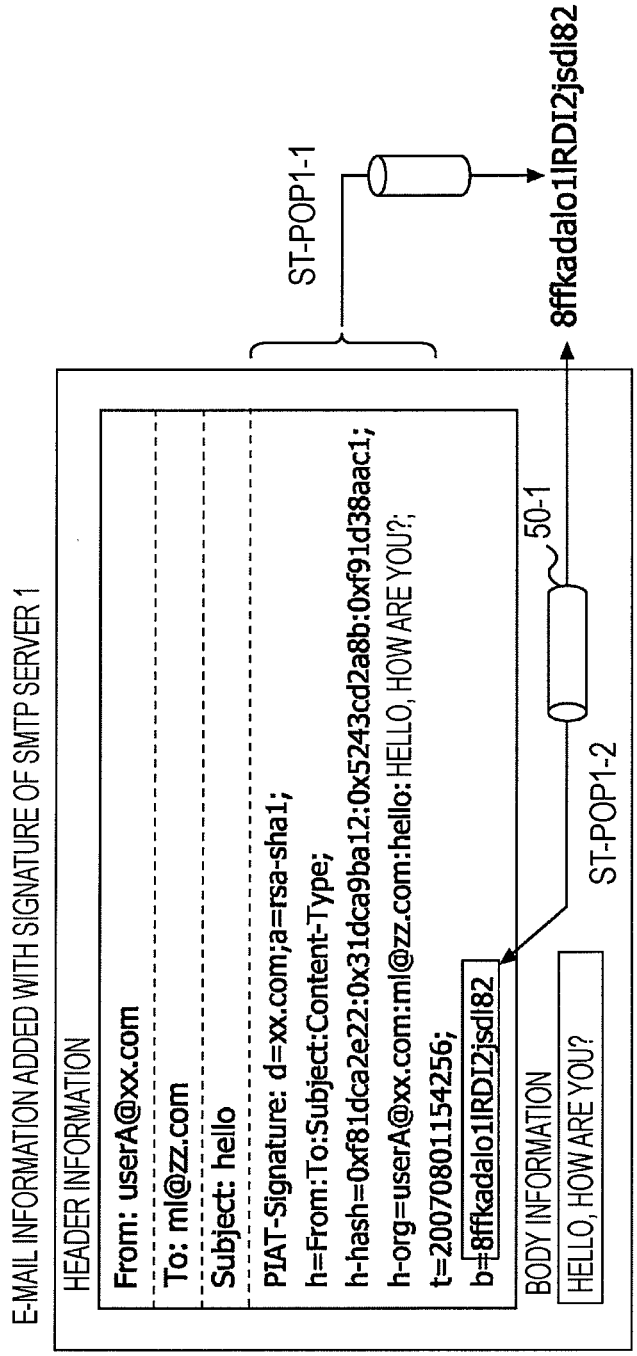
FIG. 5 is a representation showing a signature verification process by a POP server 1 within a domain 2 in the first embodiment.

FIG. 5 shows the signature verification process executed by the POP server 1 in the domain 2. First, the POP server 1 verifies the "PIAT-Signature:" header, which has been added to the signature header information, to confirm that the received mail is information properly sent from the SMTP server 1.

More specifically, the POP server 1 first acquires, from the SMTP server 1, the public key corresponding to the secret key which has been used to produce the signature information. To that end, the information acquired by the SMTP server 1 at that time needs to be stored in the "PIAT-Signature:" header. Then, the POP server 1 produces a hash value from the contents of the "PIAT-Signature:" header (not including the attribute b, i.e., the signature information, in this embodiment), and it also produces the signature information (ST-POP1-1). Here, "rsa-sha1" stored in the attribute a is used as the algorithm for producing the signature information.

Next, the POP server 1 takes out the hash value from the signature information, which is stored in the attribute b within the "PIAT-Signature:" header by employing the previously acquired public key, and compares the taken-out hash value with the hash value produced from the received E-mail information (ST-POP1-2).

The comparison of both the hash values can be performed by using the signature header information tampering verifying unit 50-1. If both the hash values are the same, this means success of the verification (certification). A header for storing the verification result may be added to notify the next delivery destination of the success of the verification. If the verification has failed, this means that some alteration has been made on the way to the POP server 1. Therefore, the failure of the verification is sent to the user A (sender).

If it is confirmed that the sent information is proper, the broadcast mail having the designated "destination (To): ml@zz.com" is sent to the supervising ML server. After having received the broadcast mail, the ML server adds "[ml:001]", which represents the ML item number, to the subject ("Subject") in the header information at a position before the original content of the subject (ST-ML-1).

Figure 6:
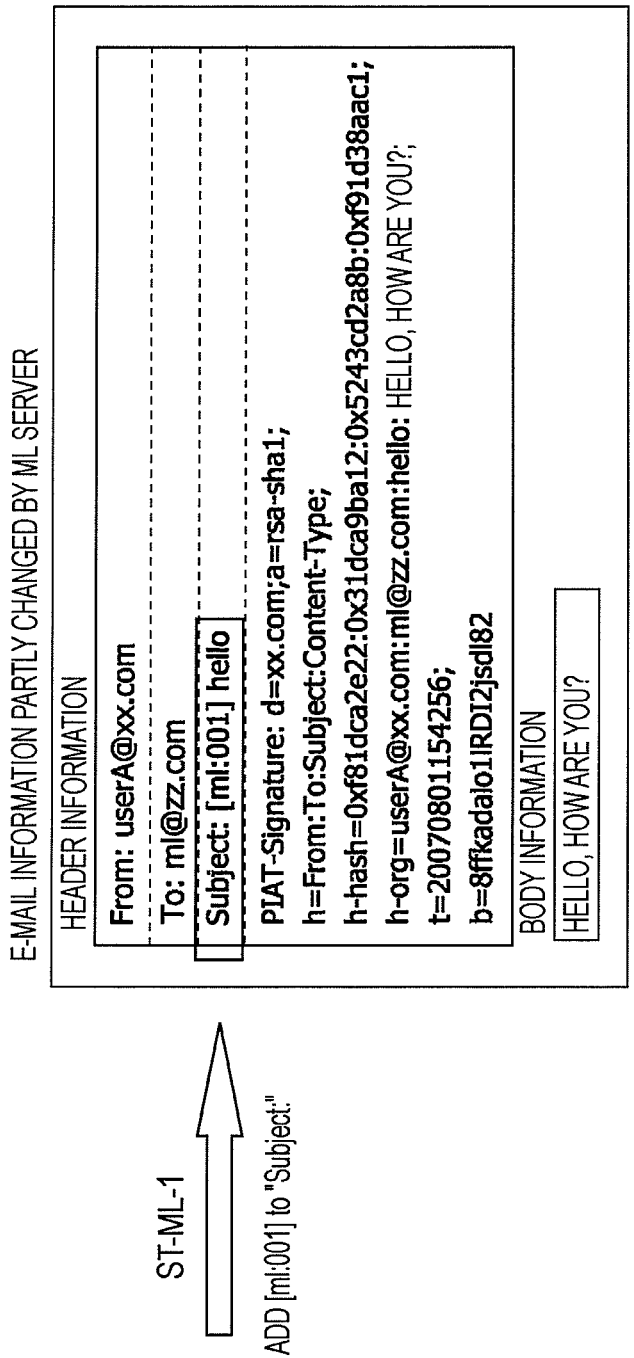
FIG. 6 is a representation showing a header changing process executed by a ML server in the domain 2 in the first embodiment.

FIG. 6 shows a state where "[ml:001]" representing the ML item number is added to the subject ("Subject"). Adding the ML item number is a general (standard) operation that is performed by the ML server to change the header information. After changing the subject ("Subject"), the ML server sends the E-mail information to the SMTP server 2.

Figure 7:
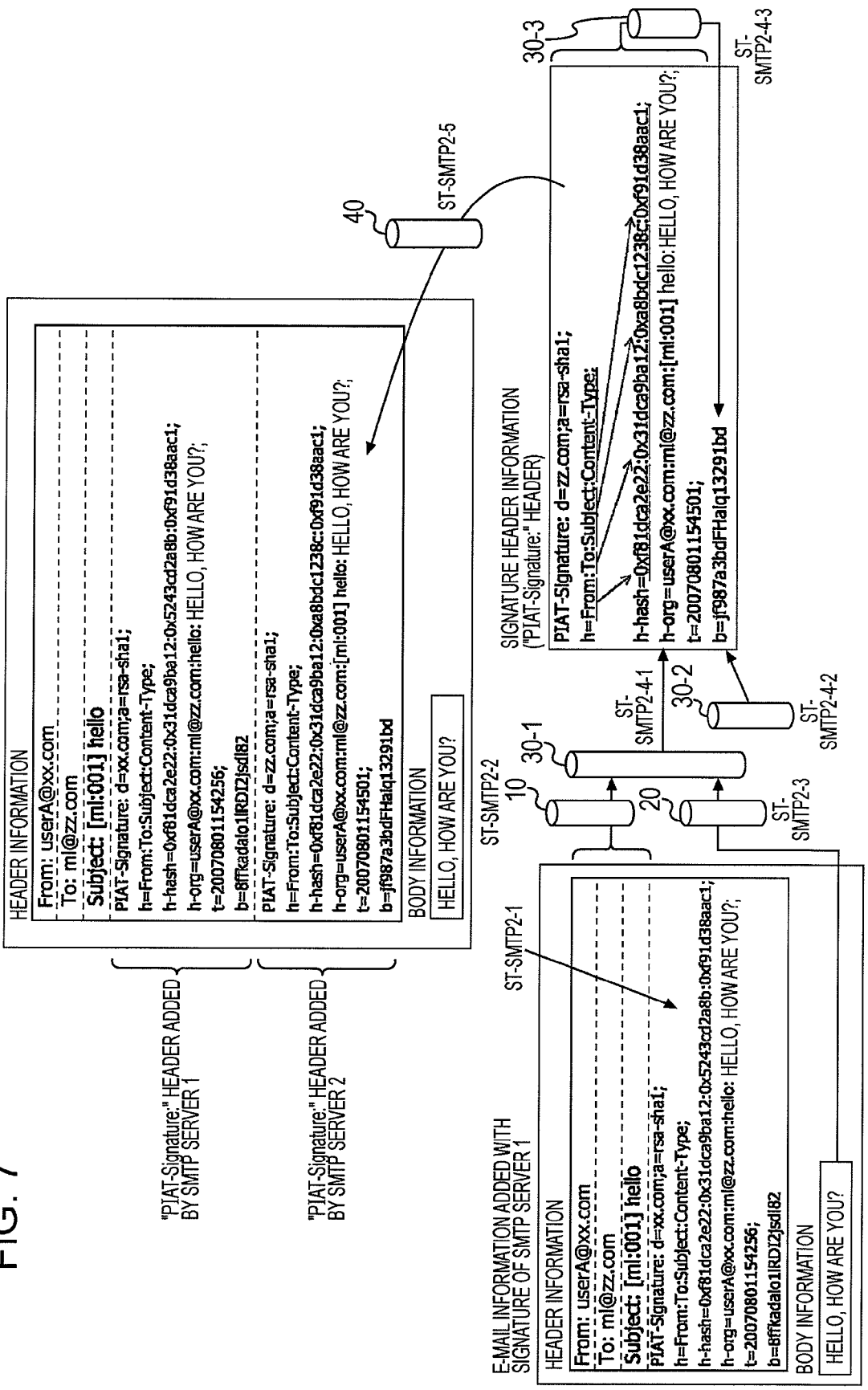
FIG. 7 is a representation showing a signature addition process by an SMTP server 2 in the first embodiment.

FIG. 7 shows a signature addition process by the SMTP server 2 in the first embodiment. For item selection to extract the signature target header information group in the SMTP server 2, the SMTP server 2 first refers to the signature header information provided by the SMTP server 1, thereby confirming which item is the signature target and acquiring information related to the method for producing the signature information (ST-SMTP2-1).

In this embodiment, it is confirmed from the information stored in the attribute h that the sender ("From"), the destination ("To"), the subject ("Subject"), and the body information ("Content-Type") are the signature targets. It is also confirmed from the information stored in the attribute a that "rsa-sha1" is to be used as the method for producing the signature information (i.e., the producing algorithm). Then, the SMTP server 2 produces the feature variable information of the confirmed signature target header information group (ST-SMTP2-2) and also produces the feature variable information of the body information (ST-SMTP2-3).

Subsequently, the feature variable information of the signature target header information group and the feature variable information of the body information are integrated together and recorded as an attribute value of the signature header information ("PIAT-Signature:" header) (ST-SMTP2-4-1).

In this embodiment, "0xf81dca2e22" is calculated as the feature variable of the "From:" header, "0x31dca9ba12" is calculated as the feature variable of the "To:" header, "0xa8bdc1238c" is calculated as the feature variable as the "Subject:" header, and "0xf91d38aac1" is calculated as the feature variable as the "Content-Type:" header, respectively.

Other examples of the attributes of the "PIAT-Signature:" header include, as attributes of the signature related information, an attribute d (e.g., d=zz.com) for storing the name of the domain where a signature has been put, and an attribute a (e.g., a=rsa-sha1) for storing an algorithm that has been used to produce the signature.

Herein, the domain name of the SMTP server 2 is stored in the attribute d instead of the domain name of the SMTP server 1, while the attribute a is held as it is. Further, the "PIAT-Signature:" header similarly records therein an attribute h-org for storing the original header information and body information, and an attribute t (e.g., t=20070801154501) for storing the information to ensure validity of the signature addition sequence (i.e., information for ensuring the proper time sequence of the signature information) (ST-SMTP2-4-2).

Upon completion of storing the above-described attributes, the signature information is produced for the entire signature header information as a target (ST-SMTP2-4-3). In this embodiment, a hash value is produced with all the contents of the "PIAT-Signature:" header (from the "PIAT-Signature:" to "t=20070801154501") being the signature target, and signature information is produced by using a secret key of the SMTP server 2. An attribute b for storing the signature information is prepared and the produced signature information is stored in the attribute b.

To produce the signature information by using a secret key, a pair of secret key and public key is previously produced in the SMTP server 2, and that secret key is used to produce the signature information. The public key in the pair is made open to the public on the SMTP server 2 so that the public key can be acquired on the receiving side.

FIG. 7 shows the case where b=jf987a3bdFHaiq13291bd is stored as the last attribute of the "PIAT-Signature:" header. Thus, by employing the "PIAT-Signature:" header (not including the attribute b, i.e., the signature information, in this embodiment) as the signature target, a scheme can be realized which does not allow the "PIAT-Signature:" header to be changed other than in the domain where the relevant signature has been added, and which can serve to prevent tampering of the "PIAT-Signature:" header. Certification power can be increased by utilizing a time stamp, i.e., a technique to ensure a confirmation time, in addition to the signature information. However, adding the time stamp is not always essential in this embodiment.

When the signature header information is completely produced by the SMTP server 2, the produced signature header information is stored in the header of the E-mail information by the signature header information storing unit 40 (ST-SMTP2-5).

At that time, since the signature header information of the SMTP server 1 is already stored in the header information, the new signature header information of the SMTP server 2 is additionally written and stored with revision status management without overwriting the previously stored signature header information. Also, the time sequence with respect to the previously stored signature header information of the SMTP server 1 can be confirmed later by referring to the attribute t recorded in the signature header information.

If validity of each attribute t is ensured by the verification of the signature information including the attribute t, this means that validity of the time sequence can also be similarly ensured. Further, if a time stamp is added to the signature header information, the time sequence can be confirmed later by referring to information of each time stamp.

When the signature header information is completely added by the SMTP server 2 and is stored in the header of the E-mail information, the mail is sent from the SMTP server 2 to the POP server 2 in the domain 3.

Figure 8:
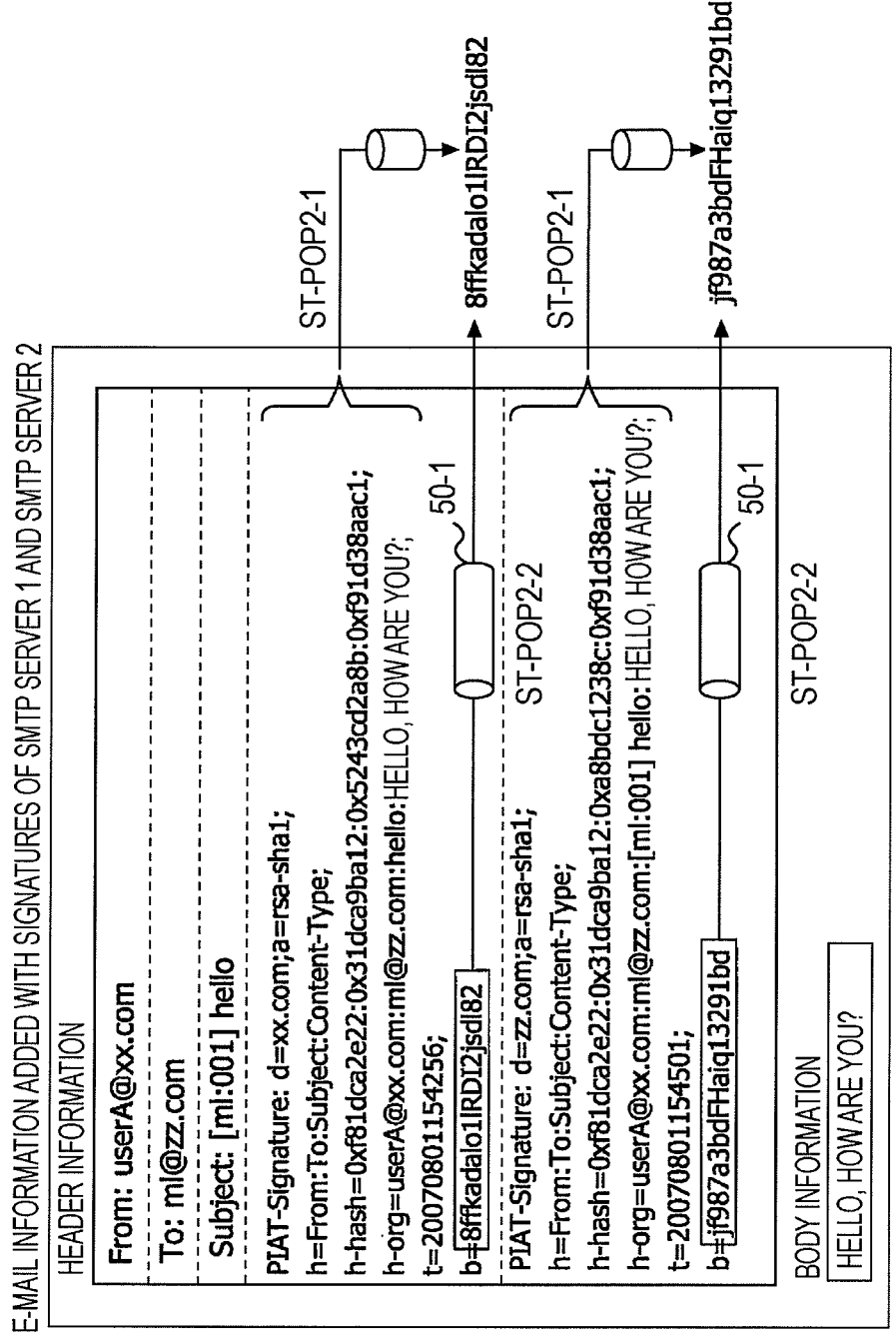
FIG. 8 is a representation showing a signature-header information tampering verification process by a POP server 2 in the first embodiment.

FIG. 8 shows the signature verification process executed by the POP server 2 in the domain 3. First, the POP server 2 verifies the "PIAT-Signature:" header, which has been added to the signature header information, to confirm that the received mail is information properly sent from the SMTP server 1 and the SMTP server 2.

More specifically, the POP server 2 first acquires, from each of the SMTP server 1 and the SMTP server 2, the public key corresponding to the secret key which has been used to produce the signature information. Then, the POP server 2 produces a hash value from the contents of the "PIAT-Signature:" header (not including the attribute b, i.e., the signature information, in this embodiment), and it also produces the signature information (ST-POP2-1).

Here, "rsa-sha1" stored in each attribute a is used to produce the signature information. Next, the POP server 2 takes out the hash value from the signature information, which is stored in the attribute b within the "PIAT-Signature:" header, by employing the previously acquired public key, and compares the taken-out hash value with the hash value produced from the received E-mail information (ST-POP2-2).

The comparison of both the hash values can be performed by using the signature header information tampering verifying unit 50-1. If both the hash values are the same, this means success of the verification (certification). A header for storing the verification result may be added to notify the next delivery destination of the success of the verification. If the verification has failed, this means that some alteration has been made on the way to the POP server 2. Therefore, the failure of the verification is sent to the user B (receiver).

If it is confirmed that the sent information is proper, the POP server 2 takes out the contents of each item of the header information and the body information. Then, the POP server 2 produces respective feature variables of each item of the header information and the body information by using the header-information feature variable producing unit 10 and the body-information feature variable producing unit 20, and compares the produced feature variables with the feature variables per item of the header information and the body information, which are recorded in the attribute h-hash of the signature header information provided by the SMTP server 2 (ST-POP2-3 and ST-POP2-4).

Figure 9:
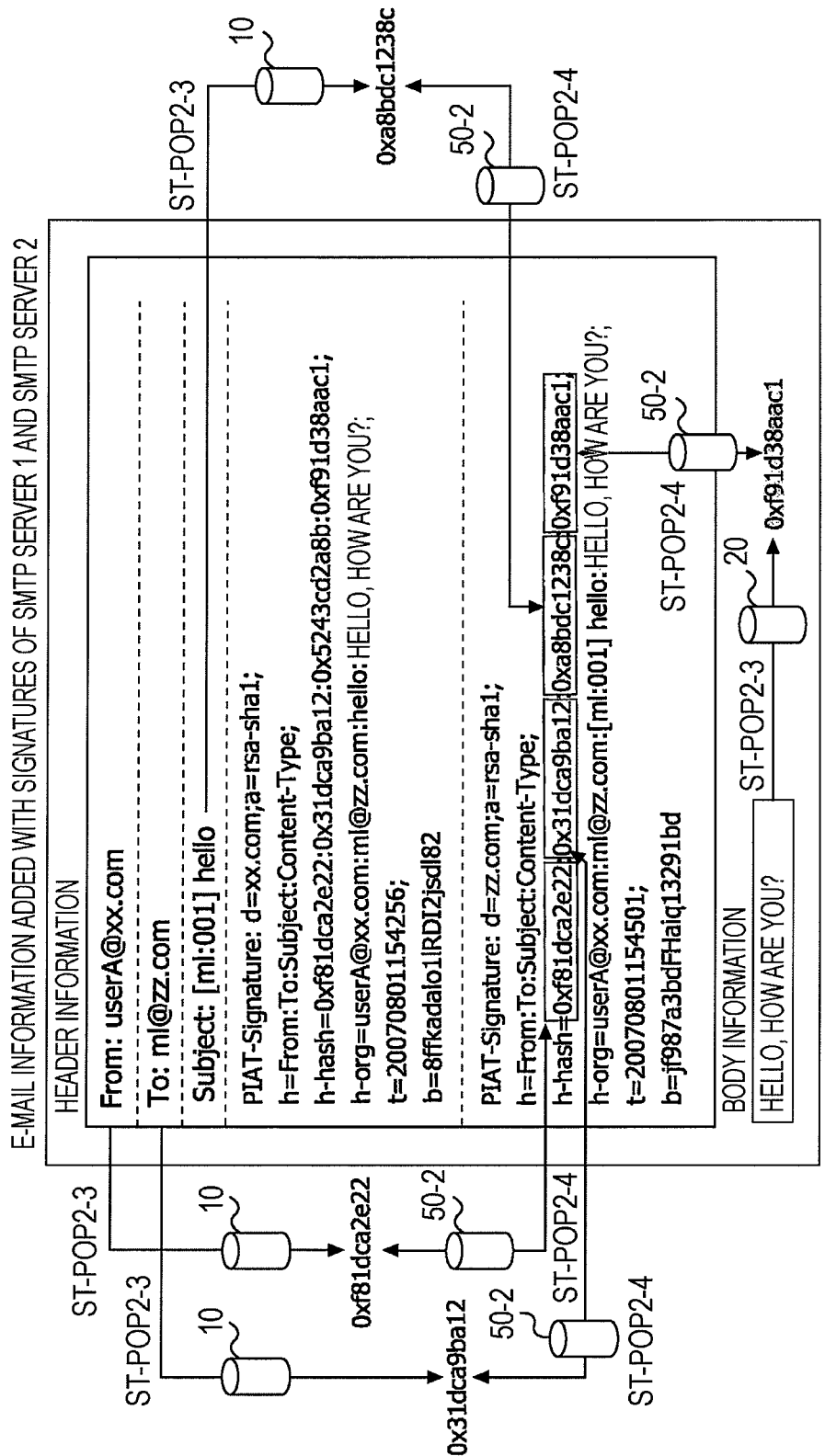
FIG. 9 is a representation showing an item-feature-variable information tampering verification process by the POP server 2 in the first embodiment.

FIG. 9 shows the verification process in such a case. More specifically, the feature variable of the "From:" header is produced from "userA@xx.com" of the "From:" header by using the header-information feature variable producing unit 10 (ST-POP2-3) and is compared with the feature variable ("0xf81dca2e22") of the "From:" header, which is recorded in the attribute h-hash of the signature header information provided by the SMTP server 2 (ST-POP2-4).

The comparison of both feature variables can be performed by using the item feature-variable information verifying unit 50-2. Subsequently, similar comparison is performed for each of the "To:" header, the "Subject:" header, and the "Content-Type" (body information) to confirm whether the compared feature variables are the same. If the comparison result indicates that the feature variables differ from each other, this means that some alteration has been made on the way to the POP server 2. Therefore, the failure of the verification is sent to the user B (receiver) If the compared feature variables in each pair are the same, the POP server 2 performs comparison and verification of respective feature variables between the signature header information of the SMTP server 1 and the signature header information of the SMTP server 2.

Figure 10:
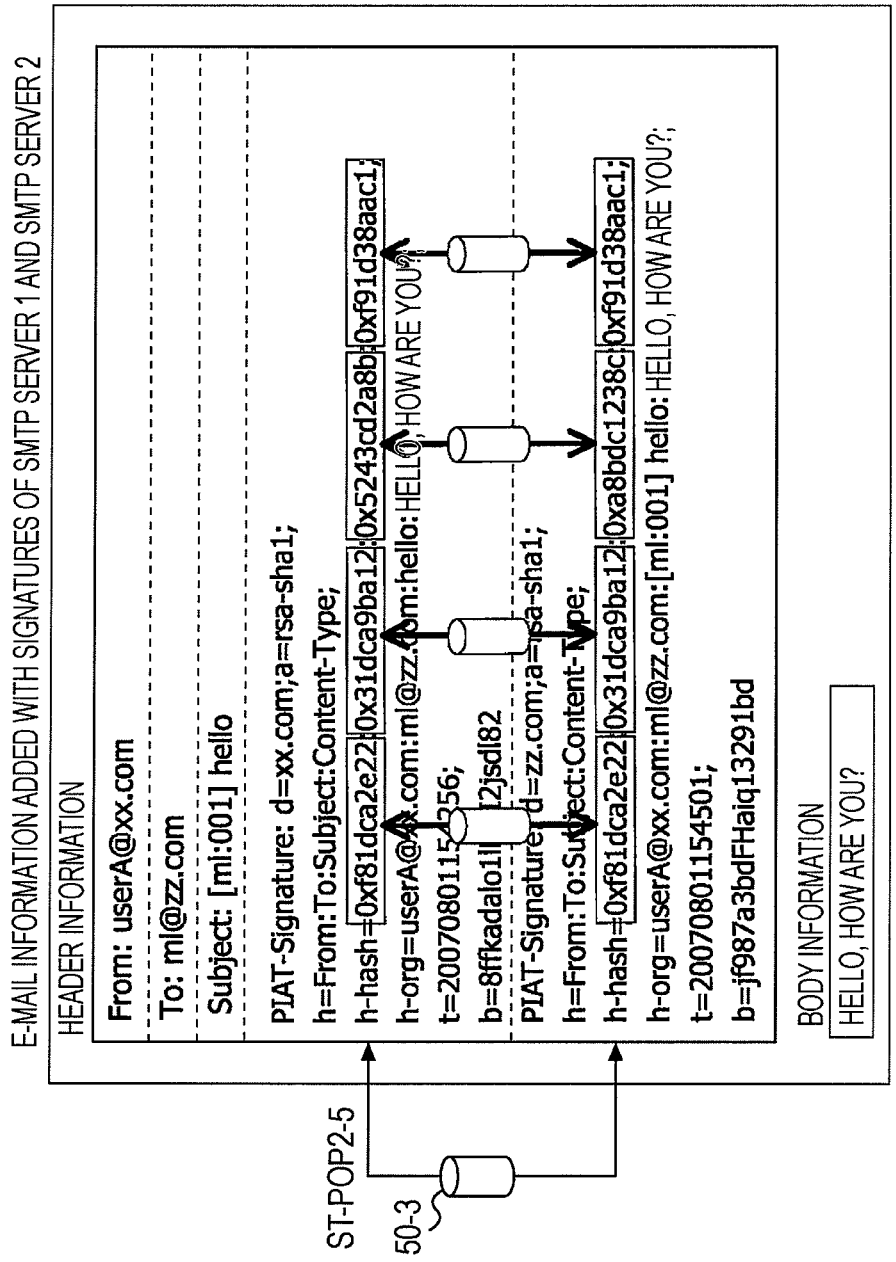
FIG. 10 is a representation showing a signature-header information verification process by the POP server 2 in the first embodiment.

FIG. 10 shows the verification process in such a case. More specifically, the POP server 2 confirms the respective attributes "h-hash" of the signature header information of the SMTP server 1 and the signature header information of the SMTP server 2, and then compares the respective feature variables of the signature target header information and the body information with each other by using the signature header information verifying unit 50-3 (ST-POP2-5).

For example, "0xf81dca2e22" recorded at the head of the attribute h-hash represents the feature variable of the "From:" header. The fact that the "From:" header is recorded at the head of the attributes h-hash can be confirmed by checking the attribute h. As the feature variable of the "From:" header, "0xf81dca2e22" is recorded in each of the signature header information of the SMTP server 1 and the signature header information of the SMTP server 2. In other words, the respective feature variables are the same. It can be therefore confirmed that no change is added to the "From:" header from a time at which the mail has been processed by the SMTP server 1.

Similarly, it can be confirmed that no change is added to the "To:" header because the respective feature variables are the same, i.e., "0x31dca9ba12", and that no change is added to the "Content-Type:" (body information) because the respective feature variables are the same, i.e., "0xf91d38aac1". On the other hand, for the "Subject:" header, different values are stored such that the feature variable of the "Subject:" header provided by the SMTP server 1 is "0x5243cd2a8b", while the feature variable of the "Subject:" header provided by the SMTP server 2 is "0xa8bdc1238c". This means that only the header information of the "Subject:" header has been changed midway in the delivery route. Further, it can be confirmed from the attribute b in the signature header information (i.e., the signature information of the SMTP server 2) that the change has been made by the SMTP server 2.

In addition, what change has been made can be confirmed by checking the respective "Subject:" header portions in the attributes h-org of the signature header information of the SMTP server 1 and the signature header information of the SMTP server 2.

In this embodiment, it is confirmed that the "Subject:" header portion is changed from "hello" to "[ml:001] hello". The attribute h-org is employed to make such confirmation. By recording information in the attribute h-org, a comprehensive verification service can be improved.

The results of the above-described comparisons and verifications are summarized as follows. The POP server 2 can notify the user B (receiver) that (1) the mail has been delivered from the SMTP server 1 through the route including the SMTP server 2, (2) [ml:001] has been added to the subject ("Subject") by the SMTP server 2, and (3) no changes are added to the contents of the sender ("From"), the destination ("To"), and the body information ("Content-Type") during the delivery.

Thus, the first embodiment enables the user B (receiver) to perform the above-described verifications by recording the respective feature variables of all items of the header information and the body information and by successively adding versions of the signature header information.

Second Embodiment

A second embodiment will be described below in connection with a scene where some information is added to the body information, in particular, where the subject ("Subject") is rewritten and an advertisement is added to the body information.

For example, an advertisement is added to the body information in the following case. Some of providers presenting ML servers with no charge insert an advertisement in part of a mail body.

Also, there is MIME-multipart mail as a typical example which includes multiple parts of body information and has identifiers capable of discriminating among the individual parts of body information.

The term "MIME-multipart" means a system for storing plural different types of data in one piece of E-mail and represents expanded specifications of the "MIME" standards for storing, in E-mail, data other than ASCII characters. The MIME-multipart is standardized as RFC 2112 by IETF (Internet Engineering Task Force) that is engaged in standardizing the Internet technical specifications. For example, the MIME-multipart is used to send an image as an attached file.

It has hitherto been allowed for E-mail to have just two parts, i.e., header information and body information. However, the "multipart" specifications enable E-mail to be divided into an arbitrary number of parts with a "separation character" serving as a boundary. As a result, for example, a body, an image, a word processor document, and voices can be sent and received in one piece of E-mail.

The MIME-multipart mail has a "Content-Type:" header for storing header information that represents an attribute of a body information portion, which is called "media type".

Figure 11:
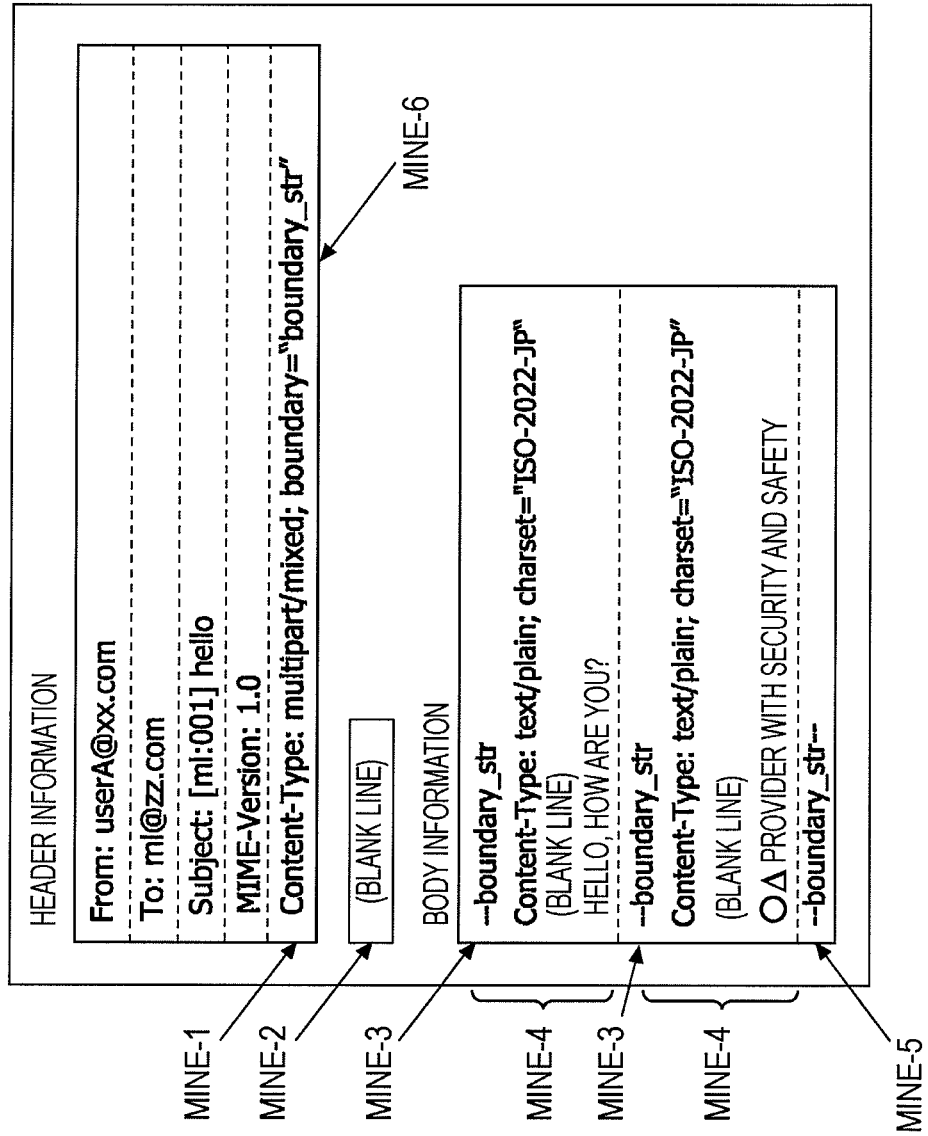
FIG. 11 is a representation showing one example of MIME-multipart E-mail information.

FIG. 11 shows one example of the MIME-multipart mail. In header information, "multipart" is first declared (MIME-1 in FIG. 11). Subsequently, there is a blank line (line of only CR(0×0d)+LF(0×0a) at the boundary between the header information and the body information (MIME-2 in FIG. 11).

The body information comprises a plurality of "mini messages", i.e., a plurality of "parts", each being made up of "MIME header information+body information" (MIME-4 in FIG. 11). A blank line is similarly present between the MIME header information and the body information. The "mini-message", i.e., the "part", corresponds to one attached file or a mail body.

In many mailers, such a "multipart" format is prepared when a text is described in the mail body and a file is attached. The boundary demarcating one part from another is indicated by a line of arbitrary character string, which is called a "boundary" (MIME-3 in FIG. 11). Such a character string is a boundary parameter in the "Content-Type:" header, and it is previously indicated in the header (MIME-6 in FIG. 11).

In FIG. 11, "--boundary_str", indicated by MIME-3, represents the start of one part. Also, in FIG. 11, "—boundary_str", indicated by MIME-5, represents the end of the entire "multipart".

Figure 12:
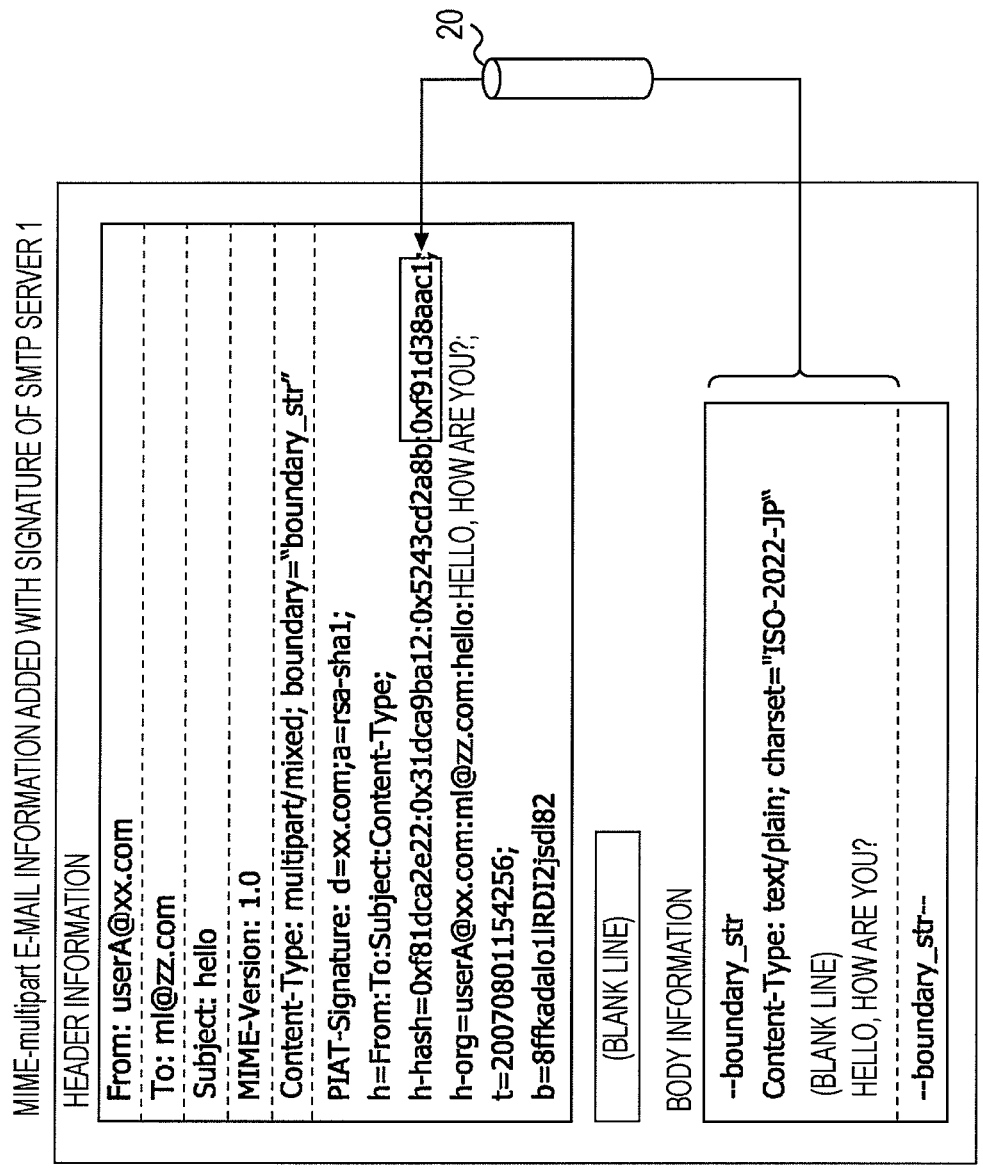
FIG. 12 is a representation showing the MIME-multipart E-mail information after addition of a signature by the SMTP server 1 in a second embodiment.

A method of producing the signature header information will be described below in connection with the case of sending the MIME-multipart mail. FIG. 12 shows a signature addition process by the SMTP server 1 in the second embodiment. The method of producing the signature header information is executed in the same procedures as those described above with reference to FIG. 4, and a detailed description thereof is omitted here. In short, a feature variable of the body information ("Content-Type") is produced while covering, as a target, "MIME header+body information" in the body information, i.e., "--boundary_str to Hello, How are you?", by using the body-information feature variable producing unit 20.

Figure 13:
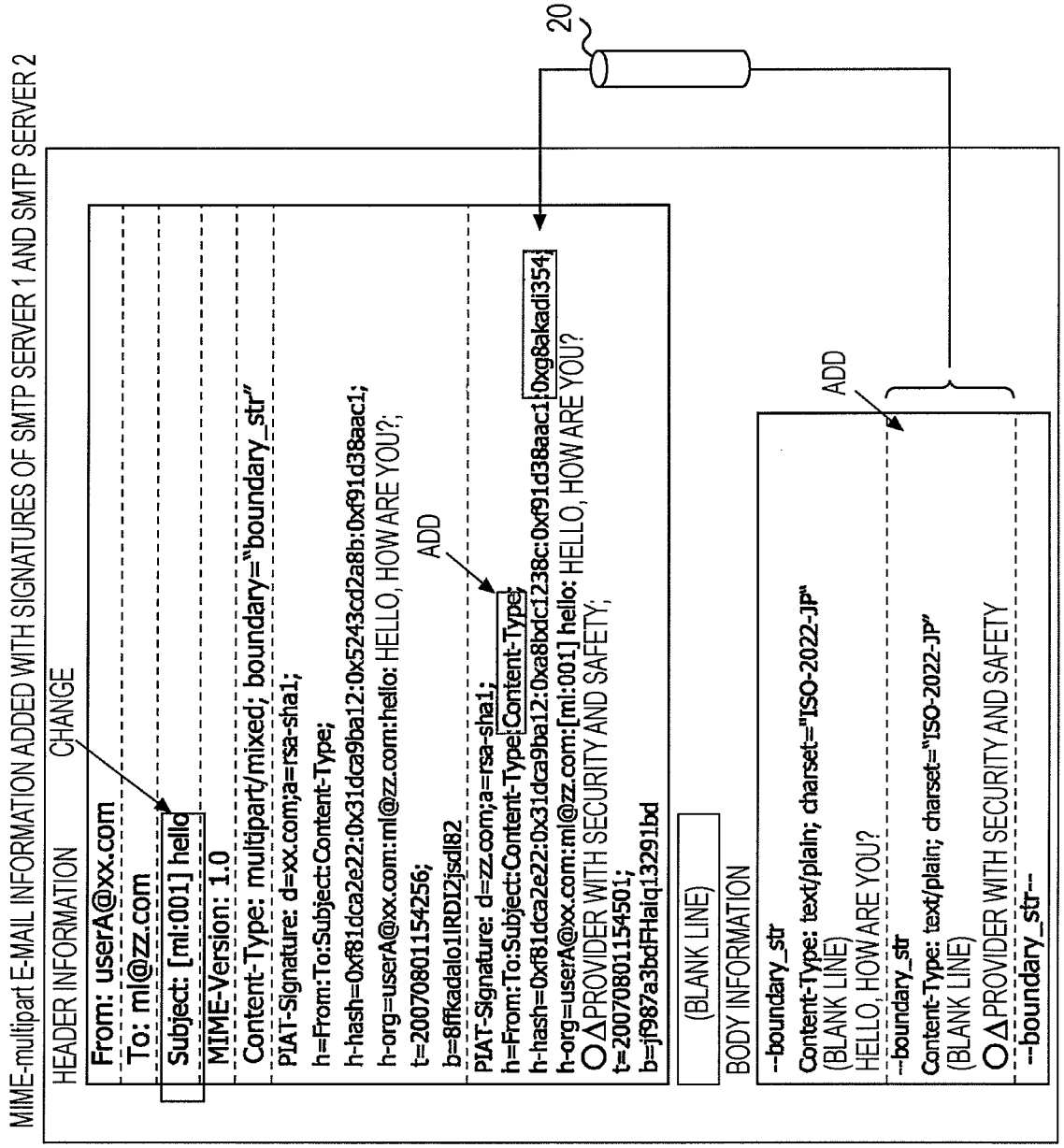
FIG. 13 is a representation showing the MIME-multipart E-mail information after addition of a signature by the SMTP server 2 in the second embodiment.

FIG. 13 shows a signature addition process by the SMTP server 2 in the second embodiment. This signature addition process is premised, as described above, on a scene where the "Subject:" header is changed by the ML server in the domain 2 and an advertisement ("○△ provider with security and safety") is added to the body information. In this case, a method of producing the signature header information is executed in the same procedures as those described above with reference to FIG. 7, and a detailed description thereof is omitted here. In short, a feature variable of the body information ("Content-Type") is produced while covering, as a target, "MIME header +body information" in the body information, i.e., "--boundary_str to ○△ provider with security and safety", by using the body-information feature variable producing unit 20.

Further, the "Content-Type" representing the body information is added to the last of the attribute h in the signature header information that has been added by the SMTP server 2. Similarly, the feature variable representing the contents of the body information (advertisement) is also added to the last of the attribute h-hash.

In the verification, similarly to the case shown in FIG. 9, the feature variable is produced from each content of the body information by using the body-information feature variable producing unit 20 and is compared with the corresponding feature variable stored in the attribute h-hash for confirmation. In the case shown in FIG. 13, however, because the names of items of the body information stored in the attribute h are each "Content-Type", it is impossible to discriminate as to which item of the body information each of the feature variables stored in the attribute h-hash corresponds.

In the case shown in FIG. 13, therefore, by assuming that the sender (STMP server 1) first records the body information and, upon receiving it, the ML server (STMP server 2) then writes the body information representing an advertisement subsequent to the body information that has been recorded by the sender, it is recognizable that the first "Content-Type" indicates the information recorded by the sender (STMP server 1) and the second "Content-Type" indicates the information recorded by the ML server (STMP server 2).

Alternatively, to which item of the body information each of the feature variables corresponds can be determined by, as described above with reference to FIG. 9, producing the feature variable of each content of the body information by using the body-information feature variable producing unit 20 and then comparing the produced feature variable with each of the feature variables stored in the attribute h-hash for confirmation of coincidence between them.

Further, the fact that the added feature variable represents the body information (advertisement) can be determined by, as described above with reference to FIG. 10, referring to both the signature header information provided by the SMTP server 1 and the signature header information provided by the SMTP server 2, and comparing respective feature variables of items of the two kinds of signature header information by using the signature header information verifying unit 50-3, thus confirming that the feature variable of the added body information (advertisement) is not present in the signature header information provided by the SMTP server 1 and is newly added to the signature header information provided by the SMTP server 2.

As an alternative, the feature variable of each content of the body information can be easily identified and confirmed by, as shown in FIG. 14, adding information to identify the contents of the body information, e.g., "X-Content-Type-body" or "X-Content-Type-Advertisement", in each "MIME" header within the body information and further storing the same information in each attribute within the signature header information.

The header information prefixed with "X-" indicates that the relevant item is uniquely added by the STMP server 1 and the ML server.

In this embodiment, both the items of the body information are each assumed to be "Content-Type: text/plain; charset-'ISO-2022-JP'". When an image file (e.g., a GIF file) is attached, its syntactic expression is given by "Content-Type image/gif" and there is no need of adding information, such as "X-Content-Type-body", for the discrimination. In the case of mail attached with, e.g., an image file, however, the information stored in the attribute h within the signature header information is preferably recorded in the form of "Content-Type image/gif" instead of just "Content-Type". Further, when two image files are attached, they are possibly not distinguished from each other if just "Content-Type image/gif" is used. For that reason, expressions of "X-Content-Type-gif1" and "X-Content-Type-gif2" are more preferable in point of discriminating the two image files from each other.

In the above-described embodiments of the present invention, an E-mail information management method can be executed on a computer by storing, as an E-mail information management program, the steps shown in each flowchart in a computer-readable recording medium. Examples of the computer-readable recording medium capable of being used in the present invention include portable storage media such as a CD-ROM, a flexible disk, a DVD disk, a magneto-optical disk and an IC card, a database holding a computer program, another computer and a database therein.

What is claimed is:

1. A non-transitory computer-readable recording medium storing an E-mail information management program for causing a computer, which manages E-mail information, to execute a process comprising:

acquiring a plurality of predetermined information from a mail header and a mail body, and acquiring, as signature related information, information relating to said plurality of predetermined information, network information of the computer, and a time stamp for signature information, thereby acquiring, as signature target information, said acquired information with attributes thereof made corresponding to respective first attribute tags;

producing feature variable information for said signature target information acquired, and acquiring said feature variable information in a corresponding relation to second attribute tags indicating said feature variable information;

producing a hash value from an entirety of both said signature target information acquired and said feature variable information produced, producing electronic signature data using a secret key of the computer and said hash value, and acquiring said electronic signature data in a corresponding relation to a third attribute tag indicating said electronic signature data;

determining whether or not to produce a fourth attribute tag including an exact copy of said mail body based on whether a size of said mail body exceeds a maximum size threshold specified by policy information;

storing, as signature header information, said signature target information acquired, said feature variable information produced, and said electronic signature data produced in a header portion of E-mail in a corresponding relation to said associated attribute tags;

storing the fourth attribute tag in said header portion of E-mail when the fourth attribute tag including the exact copy of said mail body is produced based on said determining indicating that the size of said mail body does not exceed said maximum size threshold specified by said policy information;

comparing, for each said attribute tag, the stored signature header information with candidate signature information included in the mail header; and determining whether each attribute of the email has been altered based on a result of said comparing.

2. The recording medium storing said E-mail information management program according to claim 1, wherein when said E-mail is received from another network, storing said signature header information in addition to header information that has already been stored in said header portion of said E-mail in said another network.

3. The recording medium storing said E-mail information management program according to claim 1, wherein said signature related information acquired includes an algorithm, which has been used in applying said electronic signature, together with an attribute tag indicating said algorithm.

4. The recording medium storing said E-mail information management program according to claim 1, wherein said signature related information acquired includes information of a time at which signature information has been produced, together with an attribute tag indicating said time information.

5. The recording medium storing said E-mail information management program according to claim 1, wherein said signature target information acquired is capable of being selectively designated.

6. An E-mail information management apparatus for managing E-mail information, the apparatus comprising:

a computer-readable recording medium which stores a program; and a computer which executes, based on the program, a process comprising:

acquiring a plurality of predetermined information from a mail header and a mail body, and acquiring, as signature related information, information relating to said plurality of predetermined information, network information, and a time stamp for signature information, thereby acquiring, as signature target information, said acquired information with attributes thereof made corresponding to respective first attribute tags;

producing feature variable information for said signature target information acquired by said acquiring, and acquiring said feature variable information in a corresponding relation to second attribute tags indicating said feature variable information;

producing a hash value from an entirety of both said signature target information and said feature variable information, producing electronic signature data using a secret key value and said hash value, and acquiring said electronic signature data in a corresponding relation to a third attribute tag indicating said electronic signature data;

determining whether or not to produce a fourth attribute tag including an exact copy of said mail body based on whether a size of said mail body exceeds a maximum size threshold specified by policy information;

storing, as signature header information, said signature target information, said feature variable information, and said electronic signature data in a header portion of E-mail in a corresponding relation to said associated attribute tags;

storing the fourth attribute tag in said header portion of E-mail when the fourth attribute tag including the exact copy of said mail body is produced based on said determining indicating that the size of said mail body does not exceed said maximum size threshold specified by said policy information;

comparing, for each said attribute tag, the stored signature header information with candidate signature information included in the mail header; and determining whether each attribute of the email has been altered based on a result of said comparing.

7. The E-mail information management apparatus according to claim 6, wherein when said E-mail is received from another network, said storing stores said signature header information additionally in said header portion of said E-mail.

8. The E-mail information management apparatus according to claim 6, wherein said signature related information includes an algorithm, which has been used in applying said electronic signature, together with an attribute tag indicating said algorithm.

9. The E-mail information management apparatus according to claim 6, wherein said signature related information includes information of a time at which signature information has been produced, together with an attribute tag indicating said time information.

10. The E-mail information management apparatus according to claim 6, wherein the signature target information is capable of being selectively designated.

11. An E-mail information management method executed by a computer which manages E-mail information, the method comprising:
- acquiring a plurality of predetermined information from a mail header and a mail body, and acquiring, as signature related information, information relating to said plurality of predetermined information, network information of the computer, and a time stamp for signature information, thereby acquiring, as signature target information, said acquired information with attributes thereof made corresponding to respective first attribute tags;
- producing feature variable information for said signature target information acquired, and acquiring said feature variable information in a corresponding relation to second attribute tags indicating said feature variable information;
- producing a hash value from an entirety of both said signature target information acquired and said feature variable information produced, producing electronic signature data using a secret key of the computer and said hash value, and acquiring said electronic signature data in a corresponding relation to a third attribute tag indicating said electronic signature data;
- determining whether or not to produce a fourth attribute tag including an exact copy of said mail body based on whether a size of said mail body exceeds a maximum size threshold specified by policy information;
- storing, as signature header information, said signature target information acquired, said feature variable information produced, and said electronic signature data produced in a header portion of E-mail in a corresponding relation to said associated attribute tags;
- storing the fourth attribute tag in said header portion of E-mail when the fourth attribute tag including the exact copy of said mail body is produced based on said determining indicating that the size of said mail body does not exceed said maximum had size threshold specified by said policy information;
- comparing, for each said attribute tag, the stored signature header information with candidate signature information included in the mail header; and
- determining whether each attribute of the email has been altered based on a result of said comparing.

12. The E-mail information management method according to claim 11, wherein when said E-mail is received from another network, storing said signature header information in addition to header information that has already been stored in said header portion of said E-mail in said another network.

13. The E-mail information management method according to claim 11, wherein said signature related information acquired includes an algorithm, which has been used in applying said electronic signature, together with an attribute tag indicating said algorithm.

14. The E-mail information management method according to claim 11, wherein said signature related information acquired includes information of a time at which signature information has been produced, together with an attribute tag indicating said time information.

15. The E-mail information management method according to claim 11, wherein said signature target information acquired is capable of being selectively designated.

16. The E-mail information management method according to claim 11, wherein said method further comprises:
- when said E-mail is sent to another network and received by said another network, verifying said received E-mail based on said signature header information in said another network.

17. The E-mail information management method according to claim 16, wherein said method comprises:
- when said verifying determines that said E-mail is valid, the E-mail information management method is executed in said another network.

* * * * *